United States Patent [19]

Nieh

[11] 4,372,873
[45] Feb. 8, 1983

[54] VANADIUM-AMINE CORROSION INHIBITOR SYSTEM FOR SOUR GAS CONDITIONING SOLUTIONS

[75] Inventor: Edward C. Y. Nieh, Austin, Tex.

[73] Assignee: Texaco Inc., White Plains, N.Y.

[21] Appl. No.: 244,446

[22] Filed: Mar. 16, 1981

[51] Int. Cl.$^3$ ................................................. C09K 3/00
[52] U.S. Cl. ............................... 252/389 R; 252/189; 252/192; 252/390; 252/392; 252/387; 422/12; 422/16; 423/220; 423/228; 423/229
[58] Field of Search .................... 252/389 B, 192, 189, 252/387, 390, 392; 423/228, 229, 220, 234, 240, 245; 422/12, 16; 106/14.05, 14.15, 14.16, 14.21

[56] References Cited

U.S. PATENT DOCUMENTS

| | | | |
|---|---|---|---|
| 2,715,605 | 8/1955 | Goerner | 202/57 |
| 3,038,856 | 6/1962 | Milligan | 252/8.55 |
| 3,269,999 | 8/1966 | Moore et al. | 260/102 |
| 3,280,097 | 10/1966 | Cizek | 260/102 |
| 3,808,140 | 4/1974 | Mago et al. | 252/389 R |
| 3,896,044 | 7/1975 | Mago et al. | 252/192 |
| 3,959,170 | 5/1976 | Mago et al. | 252/189 |
| 4,096,085 | 6/1978 | Holoman, Jr. et al. | 252/189 |
| 4,100,099 | 7/1978 | Asperger et al. | 252/189 |
| 4,100,100 | 7/1978 | Clouse et al. | 252/189 |
| 4,102,804 | 7/1978 | Clouse et al. | 252/189 |
| 4,112,050 | 9/1978 | Sartori et al. | 252/189 |

*Primary Examiner*—J. L. Barr
*Attorney, Agent, or Firm*—Jack H. Park; Kenneth R. Priem; David L. Mossman

[57] ABSTRACT

The corrosion of iron and steel surfaces by an aqueous alkanolamine conditioning solution used to remove $CO_2$ from a gas stream is effectively inhibited by a combination of a vanadium containing ion and a di- or triamine. A surprising fact is that some of the amine co-inhibitors have been identified by others in the art as promoting ferrous metal corrosion.

8 Claims, No Drawings

VANADIUM-AMINE CORROSION INHIBITOR SYSTEM FOR SOUR GAS CONDITIONING SOLUTIONS

BACKGROUND OF THE INVENTION

1. Field of the Invention

The present invention relates to inhibitor compositions useful for preventing corrosion of ferrous metal surfaces by alkanolamine solvents used in treating sour gas streams and more particularly relates to such inhibitor compositions which contain vanadium and a di- or triamine.

2. Prior Art

It has been a long standing commercial practice to use aqueous alkanolamine solutions (e.g. a monoethanolamine solution) to absorb acidic acids such as $CO_2$, $H_2S$, COS and HCN to condition naturally occurring and synthetic gases. These treated gases may include feed synthesis gases, natural gas and flue gas. Frequently, the conditioning process is practiced by passing a 5 percent to 30 percent alkanolamine solution countercurrent to a gas stream in an absorption column to remove the acid gases. The absorbed acid gases may be later forced out of the conditioning solution at higher temperatures and the alkanolamine solution recycled for more absorbing.

Aqueous alkanolamine solutions are not themselves very corrosive toward ferrous metal equipment, however, they become highly corrosive when acid gases are dissolved therein, particularly when the solution is hot. It has been found that both general and local corrosive attack can occur. This is a particular problem in reboilers and heat exchangers where the steel is exposed to a hot, protonated alkanolamine solution. A heat transferring metal surface appears to be especially vulnerable. Previous investigation by others have revealed that under conditions corrosive products such as aminoacetic, glycolic, oxalic and formic acids were formed. The monoethanolamine salts of these acids present the possibility of increased attack upon ferrous metals.

One of the most economical and efficient methods of treating this corrosion problem is by including small quantities of corrosion inhibitors. Various metal compounds have been used by others alone or in combination with co-inhibitors, for example, such as compounds of arsenic, antimony and vanadium. These metal compounds seem to be much more effective against $CO_2$-promoted corrosion than they are when $H_2S$ has been absorbed in the conditioning solution.

A number of U.S. patents have been granted relating to the use of corrosion inhibitor additives. For example, the use of antimony was described in U.S. Pat. No. 2,715,605. A number of amine compounds were found to be useful in preventing corrosion by addition to petroliferous oil well fluids containing carbon dioxide or hydrogen sulfide brines, as disclosed in U.S. Pat. Nos. 3,038,856; 3,269,999 and 3,280,097. U.S. Pat. No. 3,808,140 relates to a combination inhibitor system using vanadium and antimony. Nitrosubstituted aromatic acids and acid salts, stannous salts, organo-tin compounds, benzotriazole, vanadium and antimony were used in various combinations as inhibitor systems for conditioning solutions as described in U.S. Pat. Nos. 3,896,044 and 3,959,170. The use of vanadium compounds as corrosion inhibitors for aqueous amine gas sweetening reagents is well known; for example see H. Ratchen and C. Kozarev, *Proceedings of the International Congress on Metallic Corrosion* 5th, 1972 and E. Williams and H. P. Lackie, *Material Protection*, July 1968, p. 21.

Pyridinium salts were found to be useful corrosion inhibitors when used together with lower alkylpolyamines, thioamides, thiocyanates, sulfides and cobalt as noted in U.S. Pat. Nos. 4,100,099; 4,100,100 and 4,102,804; as well as U.S. Pat. Nos. 4,096,085 and 4,143,119. Still another U.S. Pat. No. 2,826,516, uses soluble silicates as effective corrosion inhibitors. However, many of these corrosion inhibitor systems have not found industry acceptance because of factors such as cost and toxicity.

Other cases related to monoethanolamine gas scrubbing operations are U.S. Pat. No. 4,184,855 which uses intercoolers and flash heat exchangers to increase the energy efficiency of the method and U.S. Pat. No. 4,183,903 which describes using cyclic ureas as antifoaming agents in the alkaline absorption solution.

It is an object of this invention to provide an aqueous alkanolamine conditioning solution inhibitor system using components which are nontoxic relative to some of the prior art systems and which permit relatively higher amine concentrations and thus higher carbon dioxide loading making for a more efficient process. What is particularly surprising about the system of this invention is that some of the amine co-inhibitors used herein have been described by the prior art as corrosion promoters. For example, U.S. Pat. Nos. 3,535,260 and 3,535,263 find that N-(2-hydroxyethyl)-ethylenediamine (HEED), also known as N-aminoethylethanolamine or AEEA, is a degradation product of monoethanolamine. Previously mentioned U.S. Pat. Nos. 3,808,140; 3,896,044 and 3,959,170 state that AEEA was found to increase corrosivity towards steel, particularly under heat transfer conditions. However, this compound was found to be an effective corrosion co-inhibitor in accordance with the method of this invention.

SUMMARY OF THE INVENTION

The invention is a corrosion inhibited composition consisting essentially of an aqueous alkanolamine solution employed in acid gas removal service and an inhibiting amount of a combination of an anion containing vanadium in the plus 4 or 5 valence state and an amine selected from the group consisting of N-aminoethylethanolamine, ethylenediamine, propylenediamine, piperazine, N-aminoethylpiperazine, methyliminobispropylamine and lower alkyl and N-hydroxyalkyl substituted derivatives thereof.

DETAILED DESCRIPTION OF THE PREFERRED EMBODIMENTS

The use of aqueous solutions of alkanolamines and particularly monoethanolamine for sour gas conditioning solutions is well known in the art. The surprising aspect of the instant invention is that vanadium-containing anions and di- and triamines together form a corrosion inhibitor system much better than the vanadium or the amines alone.

Vanadium-containing compounds are thought to act as oxidant-type inhibition catalysts which undergo a redox reaction at the ferrous metal surface. It is thought that the iron needs to be somewhat corroded for the vanadium to be effective. The limited corrosion would place the iron in the proper valance state for protective film formation.

The choice of vanadium compounds is not critical since it is the vanadium-containing anion, particularly vanadium in the plus 4 or 5 valence state, which provides this unusual corrosion inhibiting property in combination with the amines. Thus, for example, one can employ vanadium oxide such as VO, $V_2O_3$, $VO_2$, $V_2O_5$ and the like; vanadium cyanides such as $K_4V(CN)_6.3H_2O$, $K_3V(CN)_6$, $2KSCN.VO(SCN)_2.5H_2O$ and the like; vanadium halides, such as fluorides, including $VF_3$, $VF_3.3H_2O$, $VF_4$, $VOF_2$, $VF_5$, chlorides including $VCl_2$, $VCl_3$, $VCl_3.6H_2O$, $VOCl$, $VOCl_2$, $VOCl_3$, $V_2O_2Cl$, $V_2O_3Cl_2.4H_2O$ or $VO_2Cl_2.8H_2O$, and bromides including $VBr_3$, $VBr_3.6H_2O$, $VOBr$, $VOBr_2$ or $VOBr_3$; vanadium sulfates including $VSO_4.7H_2O$, $V_2(SO_4)_3$, $VOSO_4$ or $(VO)_2(SO_4)_3$; vanadates including orthovanadates, represented by the generic formula: $M_3VO_4$, pyrovanadates, represented by the general formula $M_4V_2O_7$ and metavanadates, represented by the general formula $MVO_3$ and the like where M represents a cation. The condensed vanadate ions which form in aqueous solutions, such as $V_6O_{17}^4$ are also useful in this invention.

For convenience in introducing vanadate ions into the inhibiting systems of this invention the alkali metals, ammonium and alkaline earth vanadates including orthovanadates, pyrovanadates and metavanadates are preferred. Exemplary of such vanadates are the following: sodium metavanadate, potassium metavanadate, lithium metavanadate, ammonium metavanadate, sodium pyrovanadate, potassium pyrovanadate, lithium pyrovanadate, ammonium pyrovanadate, sodium orthovanadate, potassium orthovanadate, lithium orthovanadate, calcium pyrovanadate, calcium metavanadate, magnesium orthovanadate, magnesium pyrovanadate, magnesium metavanadate, ferrous orthovanadate, ferrous pyrovanadate, ferrous metavanadate, and the like.

Other forms of vanadium that can be used in this invention include: the vanadovanadates, double vanadates, i.e., heteropoly acids containing vanadium and the peroxy vanadates having the general formula: $MVO_4$.

Generally, the amine co-inhibitor may be any di- or triamine which may serve as a chelating agent. It is thought that this chelating effect may contribute to corrosion inhibition by somehow affecting the surface layer of iron molecules. It is especially preferred that the amine used be selected from the group of amines consisting of N-aminoethylethanolamine, ethylenediamine, propylenediamine, piperazine, N-aminoethylpiperazine, methyliminobispropylamine as well as lower alkyl and N-hydroxyalkyl substituted derivatives thereof. For the purpose of this invention, "lower alkyl" is defined to be an alkyl moiety having one to four carbon atoms. It is anticipated that one skilled in the art could use more than one of the amines to optimize this inhibitor method.

As will be seen in the examples, the corrosion inhibitor system is effective even if very small amounts of additives are used. For example, the vanadium-containing anion is seen to be effective in concentrations as low as 100 parts per million while the amines may be effective in concentrations lower than 0.5 weight percent. Of course, now that this particular corrosion system has been discovered, it is merely a matter for one skilled in the art to optimize the system for a particular application. Upper limits on the inhibitors might be 600 ppm for vanadium and 1.0 weight percent for the amines, but these limits would vary depending on co-inhibitor concentrations and the application. The precise concentrations must be set as a balance between the needs of the conditioning solution and the economics of using relatively high inhibitor concentrations.

The inhibitor combination is particularly useful in aqueous lower alkanolamine solutions known as sour gas scrubbing solvents. Preferred lower alkanolamines can be defined as those having the formula:

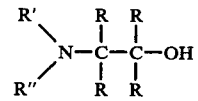

wherein R' and R" independently represent hydrogen or —$CR_2CR_2$—OH and wherein each R may be hydrogen or an alkyl radical of 1–2 carbon atoms. Representative alkanolamines are ethanolamine, diethanolamine, triethanolamine, isopropanolamine, diisopropanolamine, and N-methyldiethanolamine. Related alkanolamines which are useful acidic gas absorbents are Methicol (3-dimethylamino-1,2-propanediol) and DIGLYCOLAMINE® [2-(2-aminoethoxy)ethanol)] agent, the latter being a product of Texaco Chemical Co. Other gas treating absorbents in which this inhibitor combination is effective include sulfolane (tetrahydrothiophene-1,1-dioxide) and aqueous potassium carbonate. These absorbents can be employed alone or in combination of two or more, usually in aqueous solution although the water may be replaced in part or wholly by a glycol.

The following examples will illustrate the method of this invention as well as disclose the method of corrosion testing employed.

EXAMPLE I

In this example the equipment involved were a set of copper strip corrosion test bombs that met ASTM D130 specifications. The covers were modified with valves and dip tubes to allow sampling of the liquid phase when the vessel was pressurized due to autogenous pressures. A Teflon ® coupon mount was attached to the dip tube and a polypropylene liner was fitted to the vessel in a manner so that the test solution was not in direct contact with the body of the vessel. In a typical experiment, 90 ml of a 50 weight percent aqueous monoethanolamine was premixed with carbon dioxide, ammonium metavanadate and N-aminoethylethanolamine. The solution was placed in the liner of the vessel. A piece of 1.48"×0.41"×0.12" 1020 mild steel coupon with a 0.25" diameter hole for mounting was freshly polished with fine Emery cloth (#JB5R, RED-I-CUT ® Carborundum), followed by rinsing with water and acetone. The dried clean coupon was then weighed and attached to the Teflon mounting in a manner such that when the vessel was closed the coupon would be totally immersed in the test solution. The vessel was sealed and placed in an 115±1° C. shaker bath for a period of 96 hours. Then the coupon was recovered and cleaned by scrubbing with a bristle brush. When needed, a mild abrasive, PUMACE ® FFF (supplied by Central Texas Chemical Co.), was employed for post-test cleaning. After the coupon was clean and dried, weight loss was determined. A series of such experiments provided the results listed in Table I.

TABLE I

| Monoethanolamine[a], wt. % | $CO_2$[b] m/m | AEEA[c], wt. % | V[d], ppm | Corrosion Rate Mils per year[e] |
|---|---|---|---|---|
| 50.0 | 0.30 | 0 | 0 | 45 |
| 50.0 | 0.30 | 1.0 | 0 | 22 |
| 50.0 | 0.30 | 0 | 100 | 60 |
| 50.0 | 0.30 | 0 | 200 | <1 |
| 50.0 | 0.30 | 1.0 | 100 | <1 |
| 50.0 | 0.30 | 1.0 | 100 | <1 |
| 50.0 | 0.39 | 0 | 0 | 24 |
| 50.0 | 0.39 | 0.87 | 0 | 30 |
| 50.0 | 0.39 | 0.87 | 0 | 22 |
| 50.0 | 0.39 | 0 | 200 | 30 |
| 50.0 | 0.39 | 0 | 300 | 11 |
| 50.0 | 0.39 | 0.87 | 100 | <1 |
| 50.0 | 0.39 | 0.87 | 200 | <1 |
| 50.0 | 0.39 | 0.87 | 300 | <1 |

[a]Monoethanolamine, low iron grade, <10 ppm Fe; made by Texaco Chemical Co.
[b]Mole $CO_2$ per mole of MEA.
[c]N-aminoethylethanolamine; available from Aldrich Chemical Co.
[d]Introduced as ammonium metavanadate, used in all examples.
[e]The corrosion rate is a measurement of linear penetration in thousandths of an inch per year as computed by the following formula:

$$\text{Rate (mils/year)} = \frac{534 \times \text{weight loss of coupon, mgs}}{(\text{coupon density, g/cc})(\text{coupon surface, sq. in.})(\text{hrs})}$$

The surprising fact about Example I is that the amine co-inhibitor, AEEA, has been found by other investigators to increase the corrosion rate of ferrous metal surfaces under heat transfer conditions. For instance, see the first column of U.S. Pat. Nos. 3,808,140, 3,896,044 and 3,959,170 and *Gas Purification* by Fred C. Riesenfeld and Arthur L. Kohl, Houston: Gulf Publishing Co., 1974, p. 85.

EXAMPLE II

Combinations of ethylenediamine (EDA) and vanadium inhibitors were tested in the manner described in Example I. Results are listed in Table II.

TABLE II

| Monoethanolamine, wt. % | $CO_2$ m/m | EDA[a], wt. % | V, ppm | Corrosion Rate Mils per Year |
|---|---|---|---|---|
| 50.0 | 0.39 | 0 | 0 | 24 |
| 50.0 | 0.39 | 0 | 200 | 30 |
| 50.0 | 0.39 | 0 | 200 | 21 |
| 50.0 | 0.39 | 0 | 300 | 13 |
| 50.0 | 0.39 | 0.87 | 0 | 22 |
| 50.0 | 0.39 | 0.87 | 100 | 15 |
| 50.0 | 0.39 | 0.87 | 200 | <1 |
| 50.0 | 0.39 | 0.87 | 300 | <1 |

[a]Ethylenediamine; made by Texaco Chemical Co.

EXAMPLE III

Combinations of propylenediamine (PDA) and vanadium inhibitors were tested in the manner described in Example I. Results are listed in Table III.

TABLE III

| Monoethanolamine, wt. % | $CO_2$ m/m | PDA[a], wt. % | V, ppm | Corrosion Rate Mils per Year |
|---|---|---|---|---|
| 50.0 | 0.39 | 0 | 0 | 24 |
| 50.0 | 0.39 | 0 | 200 | 30 |
| 50.0 | 0.39 | 0 | 200 | 21 |
| 50.0 | 0.39 | 0.87 | 0 | 34 |
| 50.0 | 0.39 | 0.87 | 100 | 20 |
| 50.0 | 0.39 | 0.87 | 200 | 12 |
| 50.0 | 0.39 | 0.87 | 300 | 9 |
| 50.0 | 0.39 | 0.43 | 100 | 21 |
| 50.0 | 0.39 | 0.43 | 200 | 18 |
| 50.0 | 0.39 | 0.43 | 300 | <1 |

[a]Propylenediamine; made by Texaco Chemical Co.

EXAMPLE IV

Combinations of N-hydroxyethylpiperazine (HEP) and vanadium inhibitors were tested in the same manner as described in Example I. Results are listed in Table IV.

TABLE IV

| Monoethanolamine, wt. % | $CO_2$ m/m | HEP[a], wt. % | V, ppm | Corrosion Rate Mils per Year |
|---|---|---|---|---|
| 50.0 | 0.39 | 0 | 0 | 24 |
| 50.0 | 0.39 | 0 | 200 | 30 |
| 50.0 | 0.39 | 0 | 200 | 21 |
| 50.0 | 0.39 | 0.87 | 0 | 31 |
| 50.0 | 0.39 | 0.87 | 100 | 24 |
| 50.0 | 0.39 | 0.87 | 200 | 26 |
| 50.0 | 0.39 | 0.87 | 300 | 12 |
| 50.0 | 0.39 | 0.43 | 200 | 7 |
| 50.0 | 0.39 | 0.43 | 300 | 3 |

[a]N-hydroxyethylpiperazine; made by Texaco Chemical Co.

EXAMPLE V

Combination of N-aminoethylpiperazine (AEP), and vanadium inhibitor were tested in the same manner as described in Example I. Results are listed in Table V.

TABLE V

| Monoethanolamine, wt. % | $CO_2$ m/m | AEP[a], wt. % | V, ppm | Corrosion Rate Mils per Year |
|---|---|---|---|---|
| 50.0 | 0.39 | 0 | 0 | 24 |
| 50.0 | 0.39 | 0 | 200 | 30 |
| 50.0 | 0.39 | 0 | 200 | 21 |
| 50.0 | 0.39 | 0.87 | 0 | 24 |
| 50.0 | 0.39 | 0.87 | 100 | 17 |
| 50.0 | 0.39 | 0.87 | 200 | 15 |
| 50.0 | 0.39 | 0.87 | 300 | 17 |
| 50.0 | 0.39 | 0.43 | 100 | 19 |
| 50.0 | 0.39 | 0.43 | 200 | <1 |
| 50.0 | 0.39 | 0.43 | 300 | <1 |

[a]Aminoethylpiperazine; made by Texaco Chemical Co.

EXAMPLE VI

Combinations of methylaminobispropylamine (MIBPA) and vanadium compounds were tested in the same manner as described in Example I. The results are listed in Table VI.

TABLE VI

| Monoethanolamine, wt. % | $CO_2$ m/m | MIBPA[a] wt. % | V ppm | Corrosion Rate Mils per Year |
|---|---|---|---|---|
| 50.0 | 0.39 | 0 | 0 | 24 |
| 50.0 | 0.39 | 0 | 200 | 30 |
| 50.0 | 0.39 | 0 | 200 | 21 |
| 50.0 | 0.39 | 0.87 | 0 | 45 |
| 50.0 | 0.39 | 0.87 | 100 | 26 |
| 50.0 | 0.39 | 0.87 | 200 | 19 |
| 50.0 | 0.39 | 0.87 | 300 | 25 |
| 50.0 | 0.39 | 0.43 | 100 | 10 |
| 50.0 | 0.39 | 0.43 | 200 | 21 |
| 50.0 | 0.39 | 0.43 | 300 | 11 |

[a]Methyliminobispropylamine; made by Texaco Chemical Co.

The effectiveness of the corrosion inhibitor system of this invention may be readily seen from the examples where the inhibiting effect of both co-inhibitors is greater than either inhibitor singly. In Example I, every instance where vanadium and AEEA were both used gave a corrosion rate of less than one mil (one-thousandth of an inch) per year. The corrosion rates given are generally good over a ten unit range or plus or minus five mils/year. In Examples IV, V and VI, it may be seen that the systems with less than 0.5 wt.% amine works better or just as well as the systems with twice as much that amine concentration. This surprising result suggests that there may be a threshold concentration for some of these amines beyond which the addition of amine gives diminishing returns. It is also noted that in all examples, the monoethanolamine concentration was 50 weight percent which is much higher than the 5 to 30 percent used in the prior art methods. As a result, the sour gas conditioning solution can be more concentrated and more effective in removing $CO_2$ than current solutions and provide corrosion protection in addition.

It is anticipated that many modifications may be made in the method of this invention without departing from the scope of this invention which is defined only by the appended claims.

I claim:

1. A corrosion inhibited composition consisting essentially of
   a. an aqueous alkanolamine solution in which the alkanolamine has the formula:

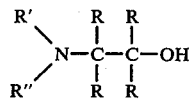

wherein R' and R" independently represent hydrogen or $-CR_2CR_2OH$ and wherein each R may be hydrogen or an alkyl radical of 1 or 2 carbon atoms, employed in $CO_2$ gas removal service,
   b. an anion containing vanadium in the plus 4 or plus 5 valence state and having a concentration in the composition of at least 100 parts per million and
   c. an amine co-inhibitor having a concentration in the composition of at least 0.4 weight percent and selected from the group consisting of N-aminoethylethanolamine, ethylenediamine, propylenediamine, piperazine, N-aminoethylpiperazine, methyliminobispropylamine and lower alkyl and N-hydroxyalkyl substituted derivatives thereof, where lower alkyl has one to four carbon atoms.

2. The composition described in claim 1 in which the aqueous alkanolamine solution is an aqueous monoethanolamine system.

3. The composition described in claim 1 in which the vanadium-containing anion is derived from a vanadium compound selected from the group consisting of orthovanadates, metavanadates, pyrovanadates, vanadium oxides and vanadium halides.

4. A corrosion inhibited composition consisting essentially of
   a. an aqueous monoethanolamine solution employed in $CO_2$ gas removal serice,
   b. an anion containing vanadium in the plus 4 or plus 5 valence state and having a concentration in the composition of at least 100 parts per million, selected from the group consisting of orthovanadates, metavanadates, pyrovanadates, vanadium oxides and vanadium halides and
   c. an amine co-inhibitor having a concentration in the composition of at least 0.4 weight percent and selected from the group consisting of N-aminoethylethanolamine, ethylenediamine, propylenediamine, piperazine, N-aminoethylpiperazine, methyliminobispropylamine and lower alkyl and N-hydroxyalkyl substituted derivatives thereof, where lower alkyl has one to four carbon atoms.

5. A method for inhibiting the corrosion of ferrous metal surfaces by an aqueous alkanolamine solution in which the alkanolamine has the formula:

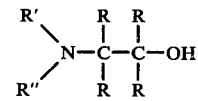

wherein R' and R" independently represent hydrogen or $-CR_2CR_2OH$ and wherein each R may be hydrogen or an alkyl radical of 1 or 2 carbon atoms, employed in $CO_2$ gas removal service consisting essentially of adding to said aqueous alkanolamine solution a combination of
   a. an anion containing vanadium in the plus 4 or plus 5 valence state having a concentration in the alkanolamine solution of at least 100 parts per million and
   b. an amine co-inhibitor having a concentration in the alkanolamine solution of at least 0.4 weight percent and selected from the group consisting of N-aminoethylethanolamine, ethylenediamine, propylenediamine, piperazine, N-aminoethylpiperazine, methyliminobispropylamine and lower alkyl and N-hydroxyalkyl substituted derivatives thereof, where lower alkyl has one to four carbon atoms.

6. The method described in claim 5 in which the aqueous alkanolamine solution is an aqueous monoethanolamine system.

7. The method described in claim 5 in which the vanadium-containing anion is derived from a vanadium compound selected from the group consisting of orthovanadates, metavanadates, pyrovanadates, vanadium oxides and vanadium halides.

8. A method for inhibiting the corrosion of ferrous metal surfaces by an aqueous monoethanolamine solution employed in $CO_2$ gas removal service consisting essentially of adding to said aqueous monoethanolamine solution a combination of
   a. an anion containing vanadium in the plus 4 or plus 5 valence state and having a concentration in the monoethanolamine solution of at least 100 parts per million, the anion being derived from a vanadium compound selected from the group consisting of orthovanadates, metavanadates, pyrovanadates, vanadium oxides and vanadium halides and
   b. an amine co-inhibitor having a concentration of at least 0.4 weight percent in the monoethanolamine solution and selected from the group consisting of N-aminoethylethanolamine, ethylenediamine, propylenediamine, piperazine, N-aminoethylpiperazine, methylaminobispropylamine and lower alkyl and N-hydroxyalkyl substituted derivatives thereof, where lower alkyl has one to four carbon atoms.

* * * * *